Aug. 6, 1963
N. SELIKSON
3,100,108
PURGING APPARATUS
Filed April 26, 1961
2 Sheets-Sheet 1
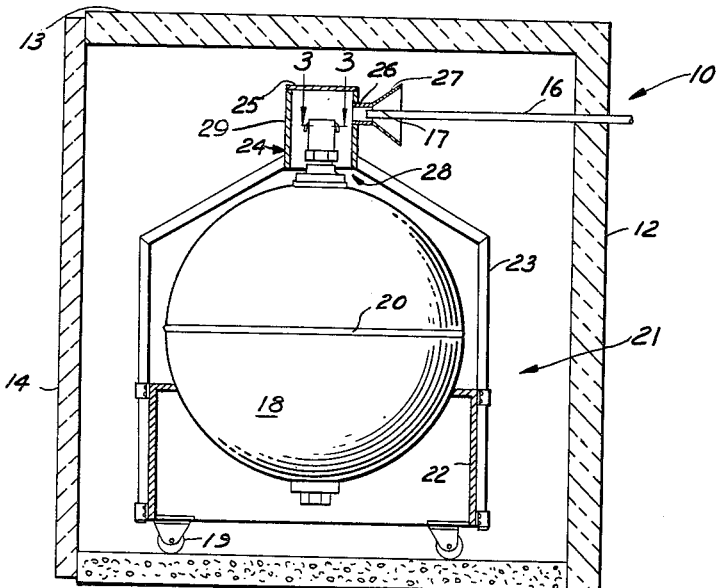
FIG. 1
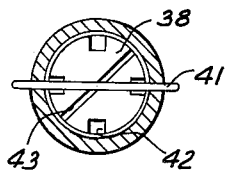
FIG. 3
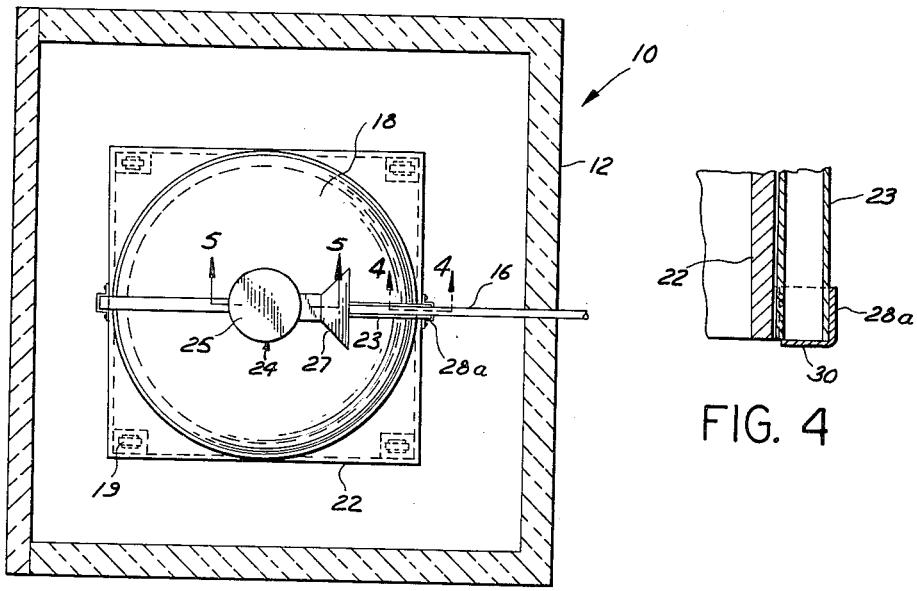
FIG. 2
FIG. 4
INVENTOR.
NATHAN SELIKSON
BY R.E. Giauque
ATTORNEY Aug. 6, 1963

N. SELIKSON 3,100,108

PURGING APPARATUS

Filed April 26, 1961

INVENTOR.
NATHAN SELIKSON

BY
R. E. Geauque

ATTORNEY

United States Patent Office 3,100,108
Patented Aug. 6, 1963

3,100,108
PURGING APPARATUS
Nathan Selikson, Sunland, Calif., assignor to Menasco Manufacturing Company, Burbank, Calif., a corporation of California
Filed Apr. 26, 1961, Ser. No. 105,597
6 Claims. (Cl. 263—40)

This invention relates to the field of heat treating and more particularly to a purging apparatus for preventing the introduction of oxidation producing gas or air into a pressure vessel undergoing heat treatment.

In the conventional practice of heat treating metal parts, it has been found difficult to heat treat a pressure vessel without the introduction of oxidation producing gas or air into the vessel interior during the heat cycle. It has been customary to employ a pressure relief valve which effects the exhaust of internally heated gas as it expands within the vessel under heated condition; however, since heat treatment of vessels composed of high tensile strength properties such as titanium or the like may take several hours, a heat cycling is encountered which includes successive cycles of heating and cooling or heating and stabilization followed by additional heating. This practice has the effect of causing the gas contained by the vessel to pressurize and expand to intermittently open and close the pressure relief valve. Because of this cycling, the pressure relief valve often permits the introduction of oxidation producing ambient air or other contaminants into the vessel interior as the valve closes.

Therefore, it is a primary purpose of the present invention to provide a hooded enclosure about the pressure relief valve carried by a pressure vessel to which an inert gas, such as argon gas or the like, can be introduced during heat treatment surrounding the valve to prevent the internal introduction of contaminants in the vessel or tank.

It is another object of the present invention to provide a novel apparatus and method for permitting the repeated release of heated gas from within a tank during a heat treatment cycle without introducing into the tank contaminated air or oxidation producing air which is normally drawn into the tank when the release of the heated gas has been effected.

It is another object of the present invention to provide a purging apparatus which will permit the introduction of an inert gas in a pressure vessel undergoing heat treatment by employing a purging hood about a pressure relief valve which contains an inert gas so that the pressure relief valve is continuously surrounded by such a gas so that on heat cycling intake into the vessel, the inert gas is introduced into the vessel rather than an oxidation producing air or gas or other damaging contaminants.

Still another object of the present invention is to provide a purging apparatus which provides a freedom of pressure relief valve operation and yet maintains the operation of the pressure relief valve within a surrounding neutral atmosphere of inert gas.

It is still a further object of the present invention to provide a novel purging apparatus to be used in conjunction with the heat treatment of a pressure vessel or tank which employs a balance system of weight and pressure so that when a pressure relief valve opens, a purging hood arranged about the pressure relief valve keeps the valve surrounded with an inert gas atmosphere under pressure so that on cycling intake into the vessel or tank, the inert gas is introduced into the vessel or tank rather than the introduction of oxidation producing air.

Other objects of the present invention and the various advantages and characteristics of the present purging apparatus will be apparent from a consideration of the following detailed description when taken in connection with the accompanying drawings of a typical embodiment of the present invention in which like numbers of reference denote corresponding parts throughout the several views thereof, in which:

FIGURE 1 is a side elevational view, partly in section, of a pressure vessel enclosed within a heat treat furnace showing a purging apparatus in accordance with the present invention;

FIGURE 2 is a top plan view of the pressure vessel and purging apparatus shown in FIGURE 1;

FIGURE 3 is an enlarged sectional view of a pressure relief valve incorporated in the purging apparatus of FIGURE 1 taken in the direction of arrows 3—3;

FIGURE 4 is an enlarged sectional view of a frame support member taken in the direction of arrows 4—4 of FIGURE 2;

Figure 5:
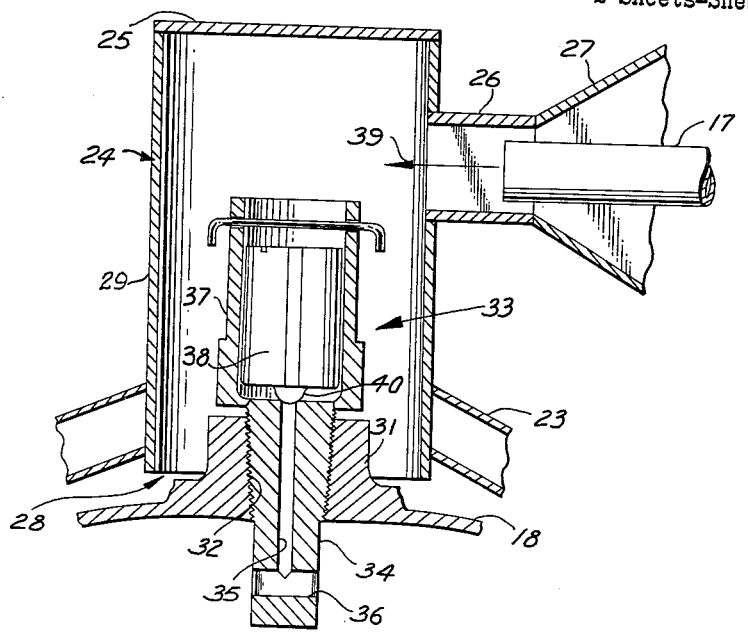
FIGURE 5 is an enlarged sectional view of the purging apparatus employed in FIGURE 1 showing the pressure relief valve closed.

With reference to FIGURES 1 and 2, the apparatus of the present invention is shown in connection with a heat treat furnace shown in the general direction of arrow 10 which includes a supporting floor 11, enclosing walls, such as wall 12, a roof 13, and a sliding door 14 for ingress and egress to the furnace interior. The furnace 10 has a cavity of sufficient size to receive a variety of parts or work pieces to receive heat treatment. Door 14 may be removed from the furnace so ingress and egress from the furnace cavity may be had. A tube 16 is supported through the wall 12 of the furnace and has an extreme cantilevered end 17 which projects substantially into the center of the furnace while its opposite end extends exteriorly of the furnace and is connected to a suitable source of an inert gas, such as argon, for example. The inert gas supplied by tube 16 is under slight pressure of sufficient p.s.i. to insure that no gas from the inside of the furnace will escape via the tube.

The present invention is shown in conjunction with a part or work piece which may be said to be a pressure vessel or tank 18 which is composed of two hemispheres joined together by an annular weld 20. Although the purging apparatus of the present invention may be employed in conjunction with parts or materials fabricated from many compositions, it has been found most effective in cases where the parts are fabricated from titanium alloys. In order to provide the interior of the vessel with a neutral atmosphere, an inert gas such as argon for example is forced into the vessel.

A frame assembly, indicated in the general direction of arrow 21, is employed for supporting the pressure vessel 18 and includes a base 22 having an enlarged hole or receiver into which the pressure vessel is seated and supported. The hole is of smaller diameter than the diameter of the vessel. The assembly further includes a plurality of wheels, such as wheel 19, attached to the base so that the entire assembly is movably supported. A pair of upright frames, such as frame 23, is detachably connected to opposite sides of the base 22 and project upwardly about the outside of the pressure vessel and then the pair of frames converge towards each other to meet at and support a hood 24. The hood is circular in horizontal cross section having an annular wall 29 and including a lid 25. The annular side wall of the hood defines an opening in the direction of arrow 28 on the opposite end of the hood to the lid 25.

The hood includes a vent arrangement 26 which communicates the inside of the hood exteriorly by means of a tube and a diverging cone shaped member 27. When the frame assembly 21 is properly positioned within the cavity of the furnace, the cantilever and projecting end 17 of tube 16 will project through the divergent member 27; therefore, it can be seen that the inert gas supplied by tube 16 will be introduced under pressure to the interior of the hood 24 via the venting arrangement 26 to maintain the hood interior with a neutral atmosphere.

FIGURE 4 more clearly shows the detachable arrangement of frame 23 to the base 22 which includes a receptacle 28a which is suitably fastened to the base and is arranged with a flange 30 to support the weight of one frame of the pair. The frame may be easily removed from the receptacle 28a by lifting the frame upward out of engagement with the receptacle 28a.

Figure 6:
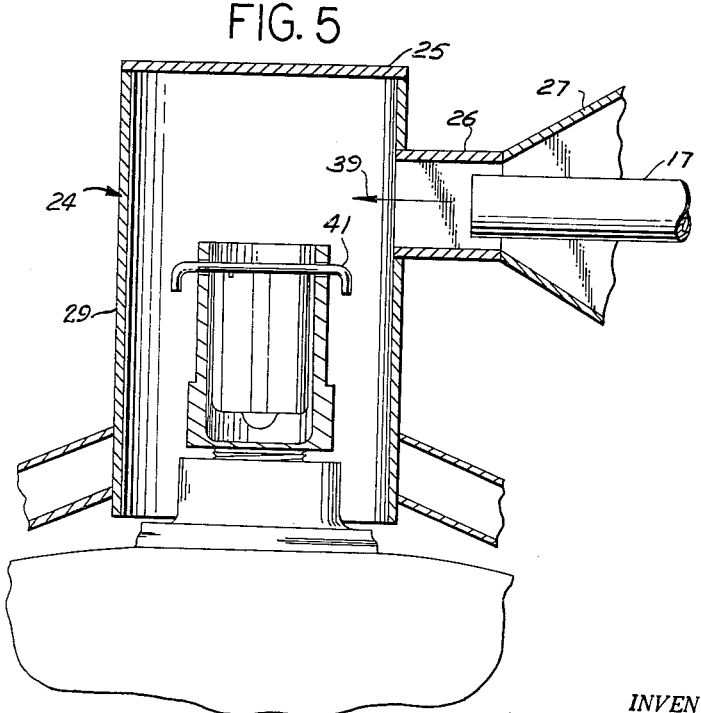
FIGURE 6 is an enlarged sectional view of the purging apparatus employed in FIGURE 1 showing the pressure relief valve opened to expel pressurized and expanding internal vessel gas.

The pressure vessel 18 is provided with a pressure relief valve detachably mounted into the apex thereof as shown more clearly in FIGURES 5 and 6. The pressure vessel includes an exteriorly formed mounting fixture 31 having an internal bore provided with a plurality of threads, such as threads 32. Projecting through the bore into the internal portion of the vessel and threadably engageable with the threads 32 of the fixture bore, there is provided a pressure relief valve in the general direction of arrow 33, which includes an elongated shank 34 having a passage 35 leading from one end of the shank into a bore 36 extending at a right angle to the passage 35 which communicates interiorly of the pressure vessel.

Projecting upward from the shank 34 is a cylinder 37 which encloses a valve closure member 38. The member 38 includes a projection 40 extending from the bottom thereof opposite the entrance to passage 35. It is to be particularly noted that projection 40 seats itself at the entrance of passage 35 against the end of shank 34 opposite to its end carrying bore 36. In such a position, the pressures between the inert gas enclosed within hood 24 and the gas enclosed by the vessel 18 are relatively equal and the passage 35 will remain closed as shown in FIGURE 5. However, when a pressure differential exists in favor of the internal vessel pressure, the expanding gas will force member 38 upward within the cylinder 37 so that its end opposite to that carrying the projection 40 will abut against a stop 41 and effect the opening of the entrance to passage 35. Stop 41 is inserted through a pair of opposing holes provided in the cylinder 37 walls and crimped on its opposite ends for retention purposes.

FIGURE 3 not only shows the stop bar 41 but illustrates a plurality of spaced elongated grooves, such as groove 42, which are provided in the outer periphery of piston 38 and are continuous from one end of the closure member to its opposite end. It is through these grooves that the pressurized gas from the interior of the vessel pass from passage 35 and out of the pressure relief valve 33 into the interior of the hood 24 in mixing relationship with the surrounding neutral atmosphere.

FIGURE 3 also shows a groove extending across the extreme top of member 38. Groove 43 may be employed to accommodate the tip of a screwdriver for lapping the valve seat.

Therefore, in actual operation, a pressure vessel or tank 18 is mounted within the receiving hole on base 22 of the frame assembly 21. The pair of frames 23 may be inserted into the proper receptacles 28a provided on opposite sides of the base 22 so that the pressure relief valve 33 is received through opening 28 into the hollow interior of hood 24. The frame assembly including the pressure vessel may be rolled into the cavity of furnace 10 so that the projecting end 17 of tube 16 enters into the venting arrangement 26. The door 14 of the furnace may be closed so that the heat treating process of the pressure vessel can be commenced.

An inert gas, such as argon, is supplied under pressure via tube 16 into the interior of the hood 24. The argon gas is pressurized to approximately 3 p.s.i. The inert gas surrounds the pressure relief valve 33 with a neutral atmosphere of argon gas free from contaminants and the pressure of this gas maintains member 38 in a position within its enclosing cylinder 37 such that projection 40 is properly seated at the entrance of passage 35 to prevent any passage of argon gas either into or out of the pressure vessel. However, upon heating of the pressure vessel during treatment, the inert gas contained within the vessel heats and expands and slowly builds up an internal pressure within the vessel. As the internal pressure approaches and exceeds 3 p.s.i., valve closure member 38 is lifted upward within the cylinder 37 and the pressurized internal gas within the vessel is conducted through bore 36 and passage 35 exteriorly of the pressure relief valve via the plurality of slots 42 into the surrounding neutral atmosphere contained within the hood 24. Should the internal pressure become stable or decrease, a certain amount of surrounding atmosphere is drawn or sucked through the pressure relief valve into the interior of the pressure vessel and mixed with the internal gas. However, since the pressure relief valve and its passages are surrounded by a neutral atmosphere of inert gas which is compatible with the gaseous atmosphere contained within the pressure vessel, no oxidation producing or contaminating air can be drawn into the interior of the pressure vessel during this portion of the cycle.

The pressurized gas relieved by the valve 33 collects within the hood 24 and eventually is distributed to the interior of the furnace via the opening 28 provided at the bottom of the hood on its end opposite to lid 25. Furthermore, should the pressure within the hood exceed 3 p.s.i., this gas will also travel through the vent arrangement 26—27. The inert gas supplied by tube 16 travels in the direction of arrow 39 shown in FIGURES 5 and 6, thus this gas is under pressure and directed towards the interior of the hood 24, when the pressure within the hood is less than approximately 3 p.s.i., a venturi action is achieved which sometimes draws surrounding heated atmosphere through the divergent section 27 and vent arrangement 26 into the hood.

Thereby, it is easily seen from the above description that the present invention provides a novel and unique purging apparatus which permits the controlled removal of pressurized gas within a pressure vessel or tank to escape via a pressure relief valve, such as valve 33, into a surrounding atmosphere of a compatible gas as that being expelled. During the heating cycle, any surrounding atmosphere which may be drawn into the pressure vessel will not contain any oxidation producing air which would cause damage and weaknesses to the internal structure of the pressure vessel or tank. It is to be understood that although approximate pressure level of 3 p.s.i. has been used in the present illustration and embodiment of the invention, various other values and amounts of pressure may be employed without departing from the invention. Furthermore, it is to be understood that the elongated slots or grooves 42 provided in the piston 38 as well as the diameter of passage 35 and the shape of projection 40 will control to some extent the weight and pressure balance system employed to provide proper and desirable pressure relief. The exact shape, configuration and other specifics do not form a part of the present invention.

Various modifications are contemplated by those skilled in the art without departing from the spirit and scope of the invention as hereinafter defined by the appended claims.

What is claimed is:

1. Apparatus for preventing the introduction of contaminants into a tank containing an inert gas during heat treatment of said tank in a furnace comprising: a pressure relief valve adapted to be secured to the tank for selectively releasing the gas contained in the tank, an enclosure having openings therein, means supporting the enclosure about the valve, and means for supplying an inert gas to the enclosure under predetermined pressure exceeding the pressure within the furnace to provide a neutral atmosphere about the relief valve.

2. The invention as defined in claim 1 whereby the valve projects into the enclosure via one of its openings and the means for supplying the inert gas projecting into another of the enclosure's openings.

3. The invention as defined in claim 2 whereby the means for supplying the inert gas includes a tube communicating between the interior of the enclosure exteriorly of the furnace.

4. Apparatus for preventing the introduction of contaminants into a tank containing an inert gas during heat treatment of said tank in a furnace comprising: a pressure relief valve adapted to be secured to the vessel for releasing the gas contained in the vessel, a base supportably mounting the vessel in the furnace, a hood having an open end for receiving and partially enclosing the pressure valve, a frame means attached to the base supporting the hood about the pressure relief valve, and means for supplying an inert gas to the hood at a pressure exceeding the pressure within the furnace to provide a neutral atmosphere about the relief valve.

5. Apparatus for preventing the introduction of contaminants into a tank containing an inert gas during heat treatment of said tank in a furnace comprising: a base for supporting the tank in the furnace, a pressure relief valve adapted to be secured to the tank adapted to release the tank contained gas when heated, an enclosure detachably supported on the base having a pair of openings, the valve arranged to project through one of the enclosure openings to define an annular passage between the enclosure and the valve communicating the enclosure interior with its exterior environment, means projecting into the furnace and through the other enclosure opening for supplying an inert gas to the enclosure at a predetermined pressure exceeding the pressure within the furnace so that the release of gas within the tank mixes with a neutral atmosphere and is purged from said enclosure, and means closing said release valve when the gas pressure within the tank decreases below the pressure of the applied gas.

6. The method of purging the interior of a pressurized tank containing an inert gas comprising the steps of: enclosing the gas relief mechanism of the tank with an enclosure to control the adjacent surrounding atmosphere, supplying an inert gas to the enclosure for providing the relief mechanism with a surrounding neutral atmosphere, releasing the pressurized gas from within the tank via the gas relief mechanism, purging the released gas from within the enclosure with the supplied gas, and introducing the supplied gas from the enclosure into the interior of the tank when the pressure in the tank reduces below the external pressure so that a neutral atmosphere free from contamination is maintained in the tank.

References Cited in the file of this patent
UNITED STATES PATENTS

| | | |
|---|---|---|
| 1,735,866 | Keller | Nov. 19, 1929 |
| 1,819,772 | Darrah | Aug. 18, 1931 |